Patented Sept. 21, 1926.

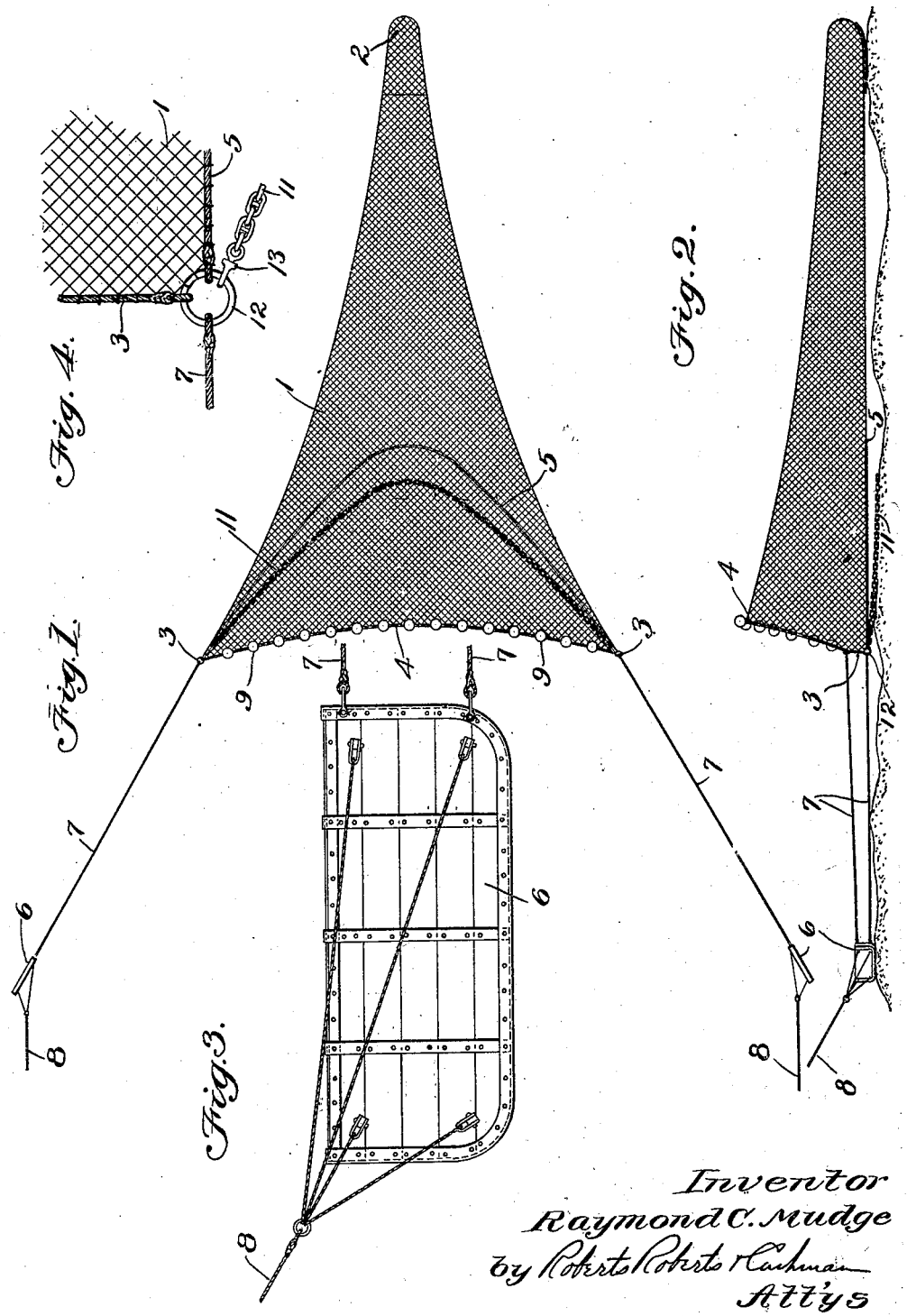

1,600,839

UNITED STATES PATENT OFFICE.

RAYMOND C. MUDGE, OF EAST BOSTON, MASSACHUSETTS, ASSIGNOR TO BAY STATE FISHING COMPANY, OF BOSTON, MASSACHUSETTS, A CORPORATION OF MAINE.

NET TRAWL FOR GROUND FISHING.

Application filed October 5, 1923. Serial No. 666,692.

This invention relates to so-called otter trawls, that is, trawls adapted to operate near the ground instead of near the surface of the water. One of the chief difficulties in operating trawls of this character is to maintain the mouth of the net properly spaced from the ground, this difficulty being particularly pronounced where the ground is uneven. If the mouth is spaced too far from the ground many of the ground fish are passed over, whereas if the net drags on the ground the wear is excessive and in rocky ground breakages are frequent.

The principal object of the present invention is to overcome the aforesaid difficulty and to provide an otter trawl which will automatically maintain a correct position relatively to the ground. Another object is to collect fish from a larger cross-sectional area of water with a net of usual size.

Still further objects will be evident from the concrete example of the invention illustrated in the accompanying drawings, in which:

Fig. 1 is a top plan of the trawl in operative position;

Fig. 2 is a side elevation of the trawl;

Fig. 3 is an enlarged side view of one of the otter boards; and

Fig. 4 is a detail showing the connection of the tickler chain hereinafter described.

The particular embodiment of the invention shown in the drawings comprises a net bag 1 tapering toward its rearward closed end 2, and having a mouth bounded by the sides 3, top 4 and bottom 5. The sides are connected to the otter boards 6 through long cables 7, and the otter boards are pulled by hawsers 8. Floats 9 are connected at intervals to the top 4 of the mouth of the bag and a tickler chain 11 is connected at the ends to the means for pulling the bag, preferably to the rings 12 in the lower corners of the mouth of the net, the chain preferably being connected through swivels 13 so that it may roll on the ground as hereinafter described.

In operation the otter boards 6, which are heavy, slide on the ground in advance of the bag as illustrated in Fig. 2. Owing to the arrangement of the connections between the boards and hawsers 8, the boards incline outwardly when pulled through the water, thus causing the boards to be separated from each other a distance much greater than the width of the mouth of the bag, thereby directing fish into the mouth of the bag throughout a path much wider than the width of the bag mouth. The vibration of the connectives 7 also tends to direct the fish toward the mouth of the net. The floats 9 preferably have sufficient buoyancy not only to buoy the top of the bag mouth upwardly, but also to lift the bag substantially clear of the ground (although the bag may sometimes touch the ground lightly, particularly if the ground is uneven). The tickler chain 11, which bows rearwardly somewhat in advance of the bottom 5 beneath the overhanging top of the bag, drags on the ground and directs the fish upwardly into the mouth of the bag. By connecting the ends of the chain through swivels the chain is permitted to roll on the ground, thereby reducing the friction, preventing fouling of the chain and keeping the chain bright so as to be more effective in directing the fish upwardly. While the central portion of the chain drags on the ground, the ends are supported by the floats (except in the event of the mouth of the bag contacting with the ground) and these non-dragging portions of the chain counterbalance the buoyancy of the floats. Thus if the mouth of the bag approaches too closely to the ground, owing to unevenness of the ground surface for example, the floats are entirely relieved from the weight of the chain, and the floats tend to lift the mouth of the bag to the proper elevation; on the contrary if the mouth of the bag is spaced too far from the ground more of the chain is supported by the floats and this added weight tends to pull the mouth of the bag downwardly into its proper position relatively to the ground.

From the foregoing, it will be evident that the present invention offers the following advantages: By virtue of the long connections between the mouth of the bag and the otter boards, fish are collected from a much wider area, namely, an area bounded on the sides by the otter boards since the boards moving through the water frighten the fish and cause them to deflect their course toward the mouth of the net. This long connection between the bag mouth and otter boards also permits the floats 9 to hold the mouth of the net substantially clear of the ground while the otter boards slide along the ground. The tickler 11 dragging along the ground frightens the fish and causes them to swim upwardly into the mouth of the net, thereby catching fish which would be otherwise passed over; and by connecting the chain 11 to the sides of the net mouth instead of to the otter boards or other parts of the pulling connections, the tickler chain further serves to counteract the buoyancy of the floats, thereby to maintain the mouth of the net properly spaced from the ground. By making the chain 11 weaker than the pulling connections, the chain will break when it hooks over a sharp rock or other obstruction which it can not dislodge or roll over, thereby merely rendering the tickler inoperative to direct fish into the mouth of the net without otherwise interfering with the functioning of the trawl. However, by making the tickler in the form of a rolling chain, more obstructions are passed over which would break a non-rolling cable.

I claim:

1. A net trawl of the type adapted to operate near the ground comprising a net bag, otter boards adapted to slide on the ground, connections between said boards and the opposite sides of the mouth of said bag respectively, floats connected to the top of said mouth, said connections being long and the floats being sufficiently buoyant to hold said mouth substantially clear of the ground while the boards slide on the ground, and a flexible elongate weight connected only at its ends to said bag near its mouth to drag on the ground and counteract the buoyancy of said floats.

2. A net trawl of the type adapted to operate near the ground comprising a net bag, otter boards adapted to slide on the ground, connections between said boards and the opposite sides of the mouth of said bag respectively, floats connected to the top of said mouth, said connections being long and the floats being sufficiently buoyant to hold said mouth substantially clear of the ground while the boards slide on the ground, the net having an upper roof part, side parts and a lower floor part, the leading edge of the floor part being substantially to the rear of the leading edge of the roof part and means dragging the sea bottom intermediate said leading edges in a horizontal direction to start the fish up from the sea bottom and into the net.

3. A net trawl of the type adapted to operate near the ground comprising a net bag, otter boards adapted to slide on the ground, connections between said boards and the opposite sides of the mouth of said bag respectively, floats connected to the top of said mouth, said connections being long and the floats being sufficiently buoyant to hold said mouth substantially clear of the ground while the boards slide on the ground, the net having an upper roof part, side parts and a lower floor part, the leading edge of the floor part being substantially to the rear of the leading edge of the roof part and a chain swivelly attached to the opposite sides of the mouth of the net at the point of connection of the net with the otter boards, said chain rolling over the sea bottom and being of a length to lie to the rear of the leading edge of the roof part of the net and in advance of the leading edge of the floor part, substantially as and for the purposes described.

Signed by me at Boston, Massachusetts, this 29th day of September, 1923.

RAYMOND C. MUDGE.